Sept. 23, 1969 P. E. BECKING ETAL 3,469,033

CORRECTION TAPE

Filed June 28, 1966

Charles T. Hatfield
Paul E. Becking
INVENTOR.

BY Robert W. B. Dickerson

ATTORNEY

United States Patent Office 3,469,033

Patented Sept. 23, 1969

3,469,033

CORRECTION TAPE

Paul E. Becking, Lake Orion, and Charles T. Hatfield, Grosse Pointe, Mich., assignors to Data-Link Corporation, San Mateo, Calif., a corporation of Delaware Filed June 28, 1966, Ser. No. 561,157
Int. Cl. G11b 23/20
U.S. Cl. 178—112 6 Claims

ABSTRACT OF THE DISCLOSURE

A strip of correction tape for repairing and/or correcting previously punched data tape, said correction tape having (1) areas of fully punched rubout code levels separated by areas of one or more blank code levels, (2) an adhesive for joining the correction tape to the existing data tape and (3) backing means removably joined to said adhesive, removable before joining the correction tape to the punched data tape.

This invention pertains to a new and improved product for correcting punched tape.

More specifically it pertains to a means for splicing and/or correcting punched tape.

One of the more recent industrial advances has been the conversion of machinery to a form whereby operations may be performed in response to tape that is punched in a predetermined manner. One such example is in the printing industry where slug casting machines are utilized by a publisher, such as a newspaper, to compose and cast lines of type, which are then used to print legible material on paper. Use of punched paper or similar material tape permits automatic slug casting control.

The tape that is used normally includes a plurality of aligned columns or channels of code positions on either side of a centrally disposed column of feed perforations, said feed perforations assuring positioning of the tape on the punching or reading device with which the tape is utilized. On unpunched tape the code position columns are unpunched. During the punching operations a certain horizontal line of perforations or code levels, made in response to an actuator, such as a keyboard, may signify a specific letter, integer or the like. After perforation or coding, the tape may then actuate the slug caster.

It oftentimes happens that errors are made in perforating the tape, or the tape may become damaged, as by tearing, or that information must be added or deleted from the tape. Thus, splicing or correcting tape has been utilized which may have all of the vertically aligned code positions in each column perforated. Such correction tape may then be aligned with and affixed to the original tape in any known manner. This tape, however makes no provision for skipping code levels, i.e., leaving them blank, which blank code levels may, if desired, then be punched. The correction tape of this invention includes groups of aligned perforations with blank code levels of known extent between said groups, thus permitting operations hereinbefore impossible to perform.

Thus this invention has as an object the provision of a correction tape having blank code levels of known extent intermediate groupings of perforations.

A further object is the provision of a correction tape which may be easily and quickly affixed to a punched paper tape.

Yet another object is the provision of a means whereby punched paper tape may be economically corrected.

These and other objects will become more apparent on considering the following description and drawings in which.

Figure 1:
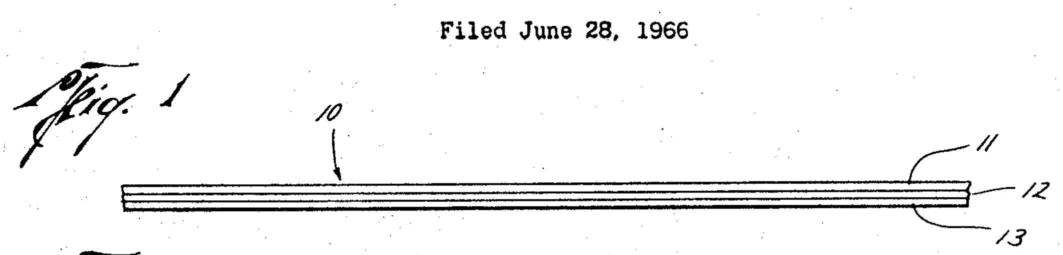
FIGURE 1 is an enlarged side elevation of the tape of this invention.
Figure 2:
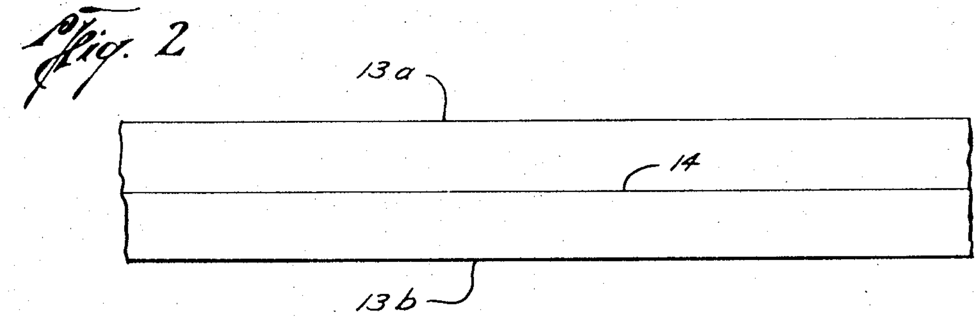
FIGURE 2 is a bottom elevation of the tape.

Looking first at FIGURES 1 and 2, the correction tape of this invention, a strip thereof being illustrated generally by the numeral 10, is essentially of sandwich configuration. The upper layer 11 is preferably of treated paper or other material susceptible to being punched. One surface of layer 11 is treated with a suitable adhesive material 12 so that the correction tape may be properly fixed to a punched tape. A backing material 13 is removably affixed to said adhesive layer. Said backing material may be severed long line 14 into adjacent strips **13*a* and 13*b*. The sides of the correction tape may be bent together so as to separate the backing material along line 14. Strips 13*a* and 13*b* may then be pulled away leaving the adhesive layer 12 exposed and free to affix the correction tape to a strip of punched tape. The backing material may be punched (not shown) in the manner of layer 11** hereinafter described.

Figure 3:
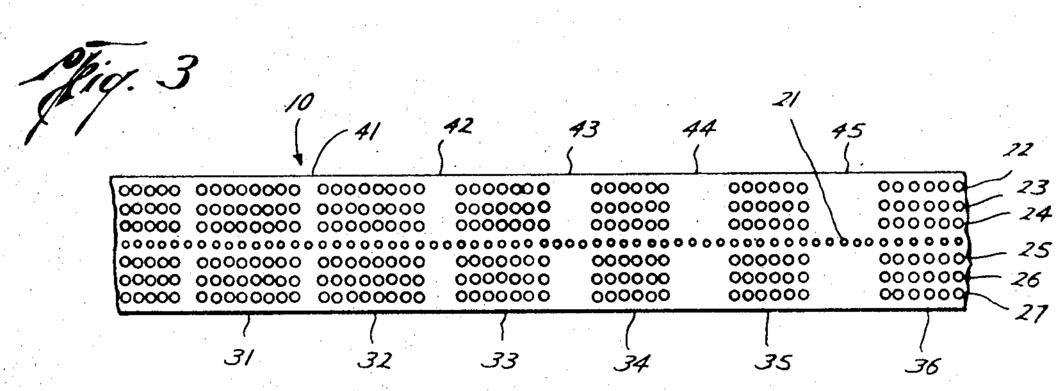
FIGURE 3 is a top elevation of the tape.

Consider now FIGURE 3, which shows the upper face of the correction tape. Centrally disposed thereon is a column of perforations 21, which forms the tape feed holes for positively positioning the tape on the reader or punching mechanism. A plurality of grouped columns or code channels 22, 23, 24, 25, 26 and 27 are aligned parallel to and adjacent the feed column. It is seen that groupings of perforations, such as 31, 32, 33, 34, 35 and 36 are spaced along the length of tape 10. Each of said groups includes a series of delete or rubout codes, i.e., all code positions in a line being perforated. Thus, grouping 34, for example, includes three code channels on either side of the feed perforations, each of said code channels being perforated at each code position. Further it is seen that each grouping of perforations 31 through 36 is separated from the adjacent grouping by blank code levels such as 41, 42, 43, 44 and 45. These blank areas may include one or more code levels. For example, 41 includes one blank code level; 42, two blank code levels; 43, three blank code levels; 44, four blank code levels; and 45 five blank code levels, a level intended to refer to a line of code positions. It should be mentioned here that the number of columns or code channels on either side of the column of feed perforations may be varied according to the requirement of the device with which the tape is utilized.

Figure 4:
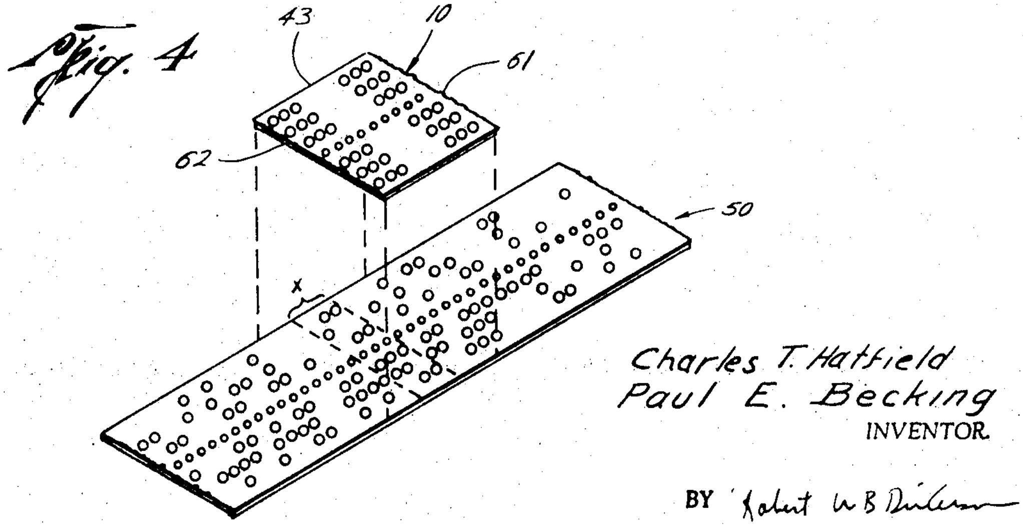
FIGURE 4 is a somewhat diagrammatic perspective of the correction tape as being applied to punched paper tape.

FIGURE 4 depicts a strip of punched paper 50 and a strip of the correction tape 10, of this invention. Assume that it is desired to delete, repair or repunch the three code levels on tape 50 indicated by the letter X It may be that said areas were erroneously punched or inadvertently torn. A strip or section of correction tape 10 may be severed, as at edges 61 and 62. The strip may then be adhesively affixed to punched tape 50 in such a manner that blank code level area 43 encompasses area or code levels X of the punched tape 50. The perforated sections of correction tape 10 adjacent said blank code levels may be used to center the correction tape atop the already punched tape 50. Thus except for the corrected area, code bits already appearing on tape 50, in the form of perforations, will still appear on the corrected tape, unpunched code positions of tape 50 will underlie the perforations of correction tape 10, and thus not change the code of a particular code level. The corrected area X will have, overlying said area X, blank code levels 43, permitting repunching or any desired operation. By providing the correction tape with a plurality of blank code level areas, said areas each have a discreet number of blank code levels, punched tape may be repaired or corrected regardless of the magnitude of the area or number of code levels that may be impaired.

Thus, it is seen that a correction tape is provided by this invention having specific blank code levels which may be affixed to a punched tape in an adhesive manner to allow splicing or correcting in a quick and economical manner.

We claim:

1. A correction tape intended to be spliced to previously punched data tape comprising:

a strip of tape having centrally aligned tape feed holes;

an adhesive surface on said strip for causing said strip to adhereto said data tape;

a plurality of fully perforated code levels forming a plurality of fully perforated areas in said strip; and at least one blank code level intermediate each adjacent pair of said fully perforated areas.

2. A strip of tape having centrally aligned tape feed holes;

the correction tape of claim 1, and including backing means, removably joined to said correction tape by said adhesive.

3. A correction tape having centrally aligned tape feed holes, for use in splicing previously punched data tape, said correction tape including:

a plurality of first areas, each of said first areas including at least one rubout code level; and intermediate each adjacent of said first areas, a second area comprising at least one blank code level.

4. The correction tape of claim 3, wherein there are a plurality of said second areas and the number of blank code levels possessed by each of said second areas is a whole number multiple of one, and there are at least one of said second areas having 2, 3, 4 and 5 blank code levels.

5. The correction tape of claim 3 and including an adhesive backing provided one surface of said correction tape permitting it to be affixed to said previously punched data tape.

6. The correction tape of claim 5 and including backing means removably joined to said correction tape by said adhesive backing.

References Cited

UNITED STATES PATENTS

| | | | |
|---|---|---|---|
| 2,244,231 | 6/1941 | Armbruster | 235—61.12 |
| 2,246,655 | 6/1941 | Bacon | 178—112 |

THOMAS A. ROBINSON, Primary Examiner

U.S. Cl. X.R.

235—61.12

PO-1050
(5/69)

UNITED STATES PATENT OFFICE
CERTIFICATE OF CORRECTION

Patent No. 3,469,033 Dated September 26, 1969

Inventor(s) PAUL E. BECKING and CHARLES T. HATFIELD

It is certified that error appears in the above-identified patent and that said Letters Patent are hereby corrected as shown below:

Claim 2, lines 1 and 2: cancel "A strip of tape having centrally aligned tape feed holes";

Claim 2, line 3: before "correction tape" change "the" to -- The --.

SIGNED AND
SEALED
DEC 23 1969

(SEAL)
Attest:

Edward M. Fletcher, Jr.
Attesting Officer

WILLIAM E. SCHUYLER, JR.
Commissioner of Patents